United States Patent
Egami et al.

(10) Patent No.: US 6,304,311 B1
(45) Date of Patent: Oct. 16, 2001

(54) METHOD OF MANUFACTURING LIQUID CRYSTAL DISPLAY DEVICE

(75) Inventors: Norihiko Egami, Hirakata; Nobutaka Hokazono, Neyagawa; Susumu Inoue, Kadoma; Shiro Sumita, Ishikawa; Naoto Sakai, Sendai; Hideki Matsukawa, Kanazawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/438,340

(22) Filed: Nov. 11, 1999

(30) Foreign Application Priority Data

Nov. 16, 1998 (JP) .................................................. 10-324605

(51) Int. Cl.⁷ ............................ G02F 1/1341; G02F 1/13; G02F 1/1337
(52) U.S. Cl. ............................ 349/189; 349/187; 349/191
(58) Field of Search .................................... 349/187, 189, 349/191; 156/153, 106, 107, 274.8, 275.5; 522/81, 83, 103

(56) References Cited

U.S. PATENT DOCUMENTS

| 5,263,888 | 11/1993 | Ishihara et al. | 445/25 |
| 5,407,519 | 4/1995 | Joffe et al. | 156/358 |
| 6,001,203 | * 12/1999 | Yamada et al. | 156/106 |

FOREIGN PATENT DOCUMENTS

| 437820 | 2/1992 | (JP) . |
| 7209656 | 8/1995 | (JP) . |
| 10268327 | 10/1998 | (JP) . |
| 11-231328 | * 8/1999 | (JP) . |
| 11-231328-A | * 8/1999 | (JP) . |

* cited by examiner

*Primary Examiner*—William L. Sikes
*Assistant Examiner*—Tarifur R. Chowdhury
(74) *Attorney, Agent, or Firm*—Price and Gess

(57) ABSTRACT

A lower substrate 3 on which an adhesive 1 has been applied and a liquid crystal material 2 has been deposited is held fixedly by vacuum suction with a suction-holding mechanism 5 within a vacuum chamber C. An upper substrate 6 held fixedly by vacuum suction with a suction-holding mechanism 7 is brought opposite to the lower substrate 3 with a predetermined spacing therebetween, and either or both of the substrates is/are brought in proximity with each other for bringing the upper substrate into contact with the adhesive 1 or the liquid crystal material 2. Both substrates 3, 6 are then moved relative to each other in a direction parallel to the substrate surface for position alignment, and thereafter, the substrates are moved closer to and pressed to each other so that they are affixed together.

20 Claims, 7 Drawing Sheets

METHOD OF MANUFACTURING LIQUID CRYSTAL DISPLAY DEVICE

BACKGROUND OF THE INVENTION

1. Technical Field of the Invention

The present invention relates to a method of manufacturing liquid crystal display devices that are used for the image display panel of a personal computer or a television.

2. Description of Prior Art

A conventional method of manufacturing liquid crystal display device is described below with reference to FIGS. 3 to 5

A liquid crystal display device is constructed as shown in FIG. 3 such that two opposite and spaced substrates, a lower substrate 11 and an upper substrate 12, both being made of a light-transmissive material, are affixed to each other with a UV-curable, photo-polymer adhesive 13, with a liquid crystal material 15 filled in a space between the substrates. The adhesive 13 contains spacers 14 having a 5 μm diameter for keeping the distance between the lower substrate 11 and the upper substrate 12 constant.

In order to dispose the liquid crystal material 15 inside of the adhesive 13 as shown in FIG. 3, one conventional liquid crystal drop method comprises the steps of applying the adhesive 13 on the lower substrate 11 to a thickness of 30 μm at the perimeter (FIG. 4A), dropping the liquid crystal material 15 to an inner side relative to the adhesive 13 (FIG. 4B), superposing the upper substrate 12 above the lower substrate 11 and pressing the substrates until the gap between both substrates becomes 5 μm (FIG. 4C), and curing the adhesive 13 by irradiating ultraviolet light, whereby the liquid crystal display device is completed (FIG. 4D).

The process of affixing the two substrates together in the above conventional method will be described in more detail with reference to FIGS. 5A through 5F.

First, a lower substrate 11, on which an adhesive 13 of UV-curable photo-polymer has been applied to a thickness of 30 μm at the perimeter, after which the resulting cavity has been filled with a liquid crystal material 15, is placed on a table 17 movable in a horizontal direction, and the entire lower surface of the substrate 11 is fixedly held by vacuum suction with a suction-holding mechanism 18 (FIG. 5A). Next, an upper substrate 12 is positioned at a distance opposite the lower substrate 11 and the entire upper surface of the substrate 12 is fixedly held by vacuum suction with a suction-holding mechanism 19 (FIG. 5B). The upper substrate 12 is then lowered so that the distance between the upper substrate 12 and the lower substrate 11 is 1 mm, and the vacuum chamber C is closed (FIG. 5C). Next, the table 17 on which the lower substrate 11 is placed is moved in a horizontal direction for adjusting the positional relationship between the upper substrate 12 and the lower substrate 11, and a vacuum is drawn within the vacuum chamber C (FIG. 5D). The upper substrate 12 is then lowered so that it contacts the adhesive 13 or the liquid crystal material 15 and is further pressed thereon until the distance between the upper and lower substrates becomes 5 μm, whereby the upper substrate 12 is affixed to the lower substrate 11 through the adhesive 13 (FIG. 5E). After that, ultraviolet rays 16 are irradiated for curing the adhesive 13 (FIG. 5F), by which the affixing of upper and lower substrates is completed.

In the above described conventional method, after the positions of the upper substrate 12 and the lower substrate 11 are adjusted relative to each other with the 1 mm spacing therebetween, the upper substrate 12 is lowered nearly 1 mm to contact the adhesive 13 and the liquid crystal material 15, and is further pressed in a vertical direction. There was thus the problem that the upper substrate 12 is sometimes misaligned relative to the lower substrate 11 during the period in which it is lowered toward and pressed onto the lower substrate 11.

SUMMARY OF THE INVENTION

In view of the above described problem in the prior art method, an object of the present invention is to provide a method of manufacturing liquid crystal display devices with which misalignment between an upper and lower substrates when affixing them together is substantially prevented, whereby defects in resulting display panels such as unevenness in image can be eliminated.

To accomplish the above object, the present invention provides a method of manufacturing a liquid crystal display device comprising the steps of positioning a first substrate on which an adhesive has been applied and a liquid crystal material has been deposited within a vacuum chamber and holding a lower surface of the first substrate fixedly by vacuum suction; a second substrate of which an upper surface is held fixedly by vacuum suction is brought opposite to the first substrate at a predetermined distance therefrom; moving one or both of the first and second substrates closer to each other for bringing the second substrate into contact with the adhesive or the liquid crystal material on the first substrate; moving both of the first and second substrates relative to each other in a direction parallel to the substrate surface for position alignment; and moving one or both of the first and second substrates for pressing the substrates to each other, whereby both substrates are affixed together.

In this method, since the position alignment of the first and second substrates is performed after the second substrate has been brought into contact with the adhesive or the liquid crystal material on the first substrate, both substrates need to be moved only a small distance when adjusting their positions relative to each other, whereby the two substrates are hardly misaligned relative to each other when they are affixed together. Defects such as unevenness in an image displayed on a resulting display panel can be accordingly eliminated.

The present invention also provides a method of manufacturing a liquid crystal display device comprising the steps of positioning a first substrate on which an adhesive has been applied and a liquid crystal material has been deposited within a vacuum chamber and holding a lower surface of the first substrate fixedly by vacuum suction; a second substrate of which an upper surface is held fixedly by vacuum suction is brought opposite to the first substrate at a predetermined distance therefrom; moving one or both of the first and second substrates closer to each other until they are located at a predetermined spacing; moving both of the first and second substrates relative to each other in a direction parallel to the substrate surface for preliminary position alignment; moving one or both of the first and second substrates closer to each other for bringing the second substrate into contact with the adhesive or the liquid crystal material on the first substrate; moving both of the first and second substrates relative to each other in a direction parallel to the substrate surface for position alignment; and moving one or both of the first and second substrates for pressing the substrates to each other, whereby both substrates are affixed together.

Misalignment between both substrates when affixing them together can be prevented and defects such as unevenness in image displayed on a resulting display panel can be accordingly eliminated, too, with this method. Moreover, since the substrates need to be moved only a small distance when adjusting their positions relative to each other owing to the preliminary positional alignment, the melting-in of the adhesive into the liquid crystal material can be suppressed.

If, in the step of bringing the second substrate into contact with the adhesive or the liquid crystal material on the first substrate, the second substrate is positioned at a height so that a minute gap is created between the second substrate and the adhesive on the first substrate, it is prevented that both surfaces are stuck together with the adhesive before the position alignment.

If a resilient member is interposed between the first substrate and a mechanism for holding the first substrate by vacuum suction, it helps the first substrate to conform to the configuration of the second substrate, whereby the spacing between the first and second substrates can be precisely controlled. In such a case, the first substrate should preferably be released from the suction hold after the first and second substrates have been affixed together, whereby both of the substrates are held by the suction-holding mechanism for the second substrate, and the flatness of both substrates can be highly maintained.

If, after the first and second substrates have been affixed together, the first substrate is released from the suction hold, and both substrates are tacked together with an UV-curable adhesive after the vacuum chamber is opened and exposed to atmospheric air, it is reliably prevented that both substrates are misaligned relative to each other after being affixed together.

Also, if, the first and second substrates are tacked together with an UV-curable adhesive after they are affixed together, and thereafter the first substrate is released from the suction hold, and the vacuum chamber is opened and exposed to atmospheric air, it is reliably prevented that both substrates are misaligned relative to each other after being affixed together.

If at least one of the first and second substrates is positioned with the use of a location mechanism, the substrate can be reliably fixed in position.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

A first embodiment of the method of manufacturing liquid crystal display devices according to the present invention will be hereinafter described with reference to FIGS. 1A through 1E.

Figure 1A:
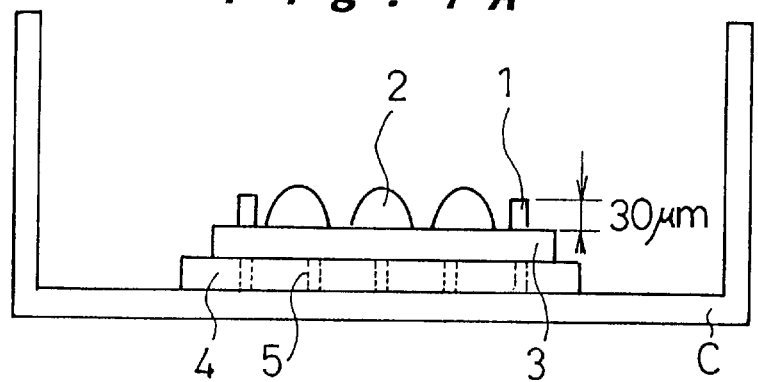
FIGS. 1A–1E are schematic sectional views showing the production steps in sequence according to the first embodiment of the method of manufacturing liquid crystal display devices of the present invention.

In step (a), a lower substrate 3 made of a light-transmissive material, on which an adhesive 1 of a UV-curable photo-polymer has been applied to a thickness of 30 ∥m at the perimeter, after which the resulting cavity has been filled with a liquid crystal material 2, is placed on a table 4 movable in a horizontal direction within a vacuum chamber C, and the entire lower surface of the substrate 3 is fixedly held by vacuum suction with a suction-holding mechanism 5 (FIG. 1A).

Figure 1B:
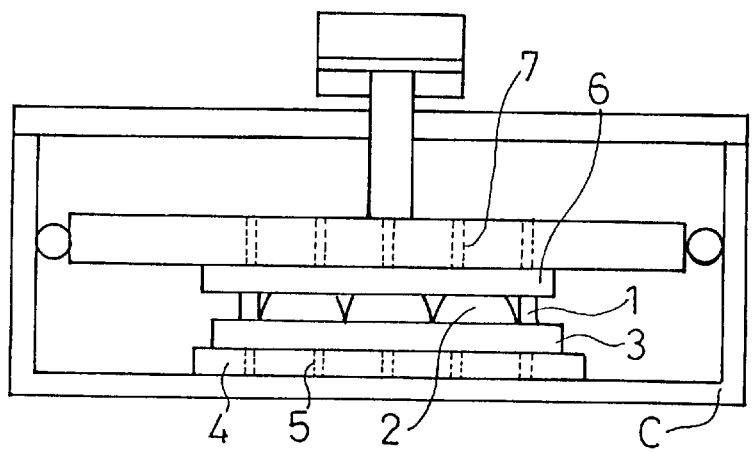

Next, in step (b), the vacuum chamber C is closed and a vacuum is drawn therein, and an upper substrate 6 made of a light-transmissive material, of which entire upper surface is fixedly held by vacuum suction with a suction-holding mechanism 7, is lowered in a vertical direction so that the upper substrate 6 contacts the adhesive 1 and/or the liquid crystal material 2 (FIG. 1B).

Figure 1C:
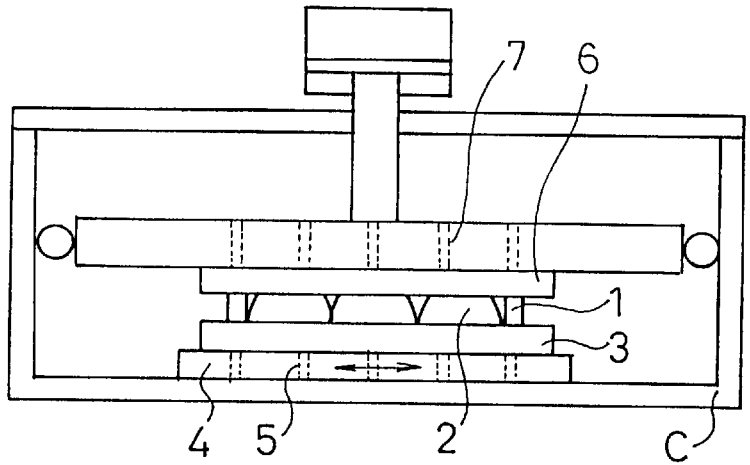

In step (c), the table 4 on which the lower substrate 3 is placed is then moved in a horizontal direction for adjusting the positional relationship between the upper substrate 6 and the lower substrate 3 (FIG. 1C).

Figure 1D:
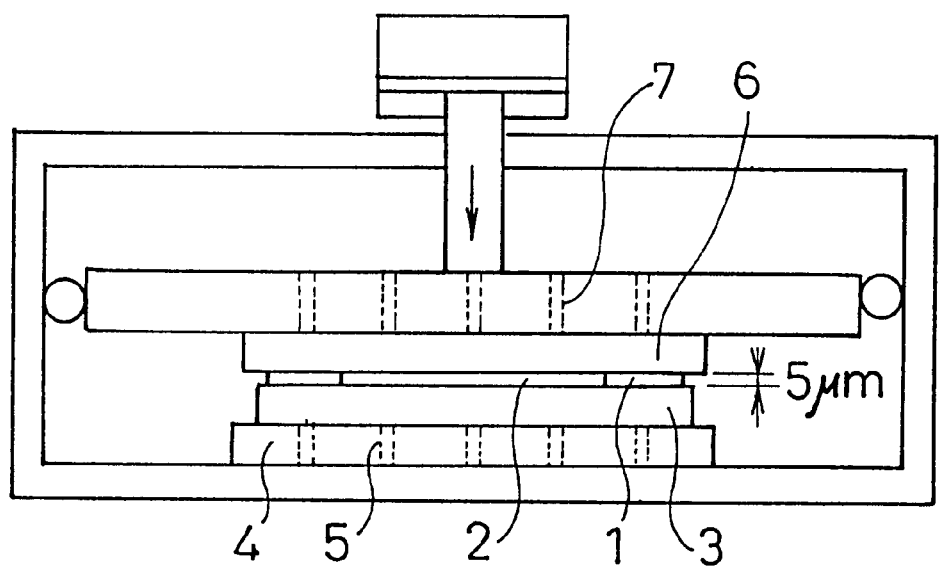

Next, in step (d), the suction-holding mechanism 7 descends in a vertical direction for affixing the upper substrate 6 onto the lower substrate 3 through the adhesive 1, and presses the upper substrate 6 until the distance between the upper and lower substrates becomes 5 $\mu$m (FIG. 1D).

Figure 1E:
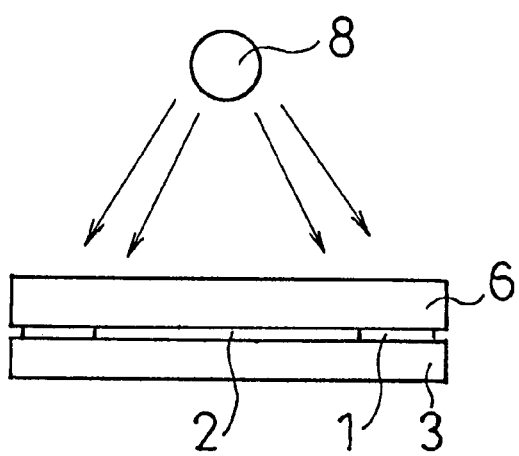

After that, in step (e), the upper and lower substrates are taken out from the vacuum chamber C, and ultraviolet rays 8 are irradiated for curing the adhesive 1, by which the affixing of upper and lower substrates is completed (FIG. 1E).

According to this method, the positioning precision of two opposite spaced substrate 3, 6 can be maintained lower than 1 $\mu$m, by which unevenness in image displayed on a resulting display panel can be eliminated.

The distance between the upper and lower substrate 3, 6 when pressed to each other in the above described step (d) can be variously set in accordance with the diameter of spacers contained in the adhesive 1.

Next, a second embodiment of the method of manufacturing liquid crystal display devices according to the present invention will be described with reference to FIGS. 2A through 2F.

Figure 2A:
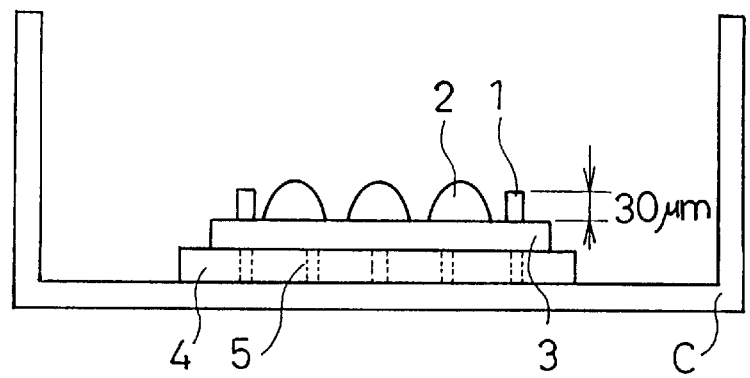
FIGS. 2A–2F are schematic sectional views showing the production steps in sequence according to the second embodiment of the method of manufacturing liquid crystal display devices of the present invention.

In step (a), a lower substrate 3 made of a light-transmissive material, on which an adhesive 1 of UV-curable photo-polymer has been applied to a thickness of 30 $\mu$m at the perimeter, after which the resulting cavity has been filled with a liquid crystal material 2, is placed on a table 4 movable in a horizontal direction within a vacuum chamber C, and the entire lower surface of the substrate 3 is fixedly held by vacuum suction with a suction-holding mechanism 5 (FIG. 2A).

Figure 2B:
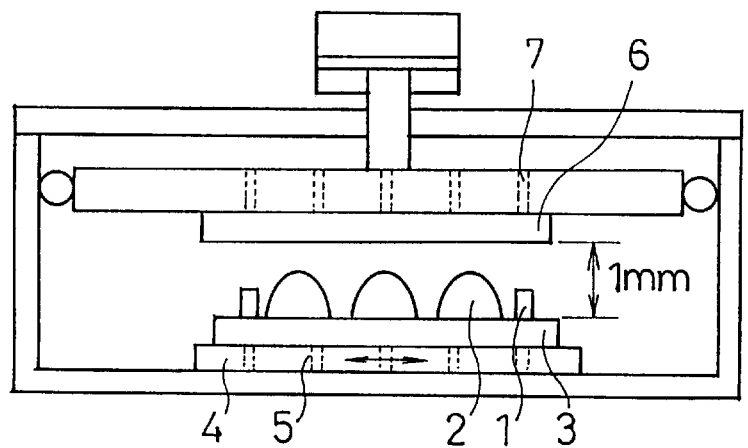

Next, in step (b), the vacuum chamber C is closed and a vacuum is drawn therein, and an upper substrate 6 made of a light-transmissive material, of which the entire upper surface is fixedly held by vacuum suction with a suction-holding mechanism 7, is lowered so that the distance between the upper substrate 6 and the lower substrate 3 is 1 mm. The table 4 on which the lower substrate 3 is placed is moved in a horizontal direction for preliminary alignment between the upper substrate 6 and the lower substrate 3 (FIG. 2B).

Figure 2C:
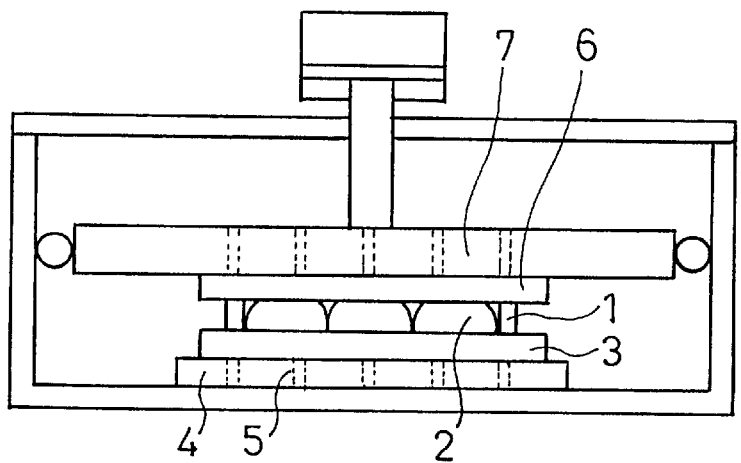

In step (c), the suction-holding mechanism 7 is lowered so that the upper substrate 6 contacts the adhesive 1 and/or the liquid crystal material 2 (FIG. 2C).

Figure 2D:
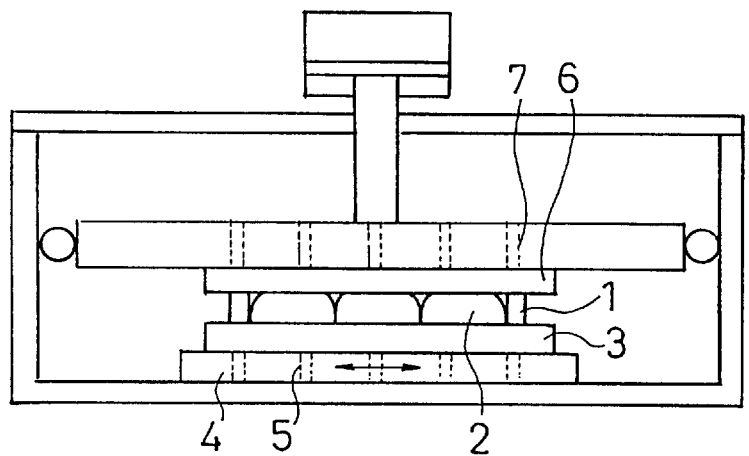

Next, in step (d), the table 4 on which the lower substrate 3 is placed is moved in a horizontal direction for adjusting the positional relationship between the upper substrate 6 and the lower substrate 3 (FIG. 2D).

Figure 2E:
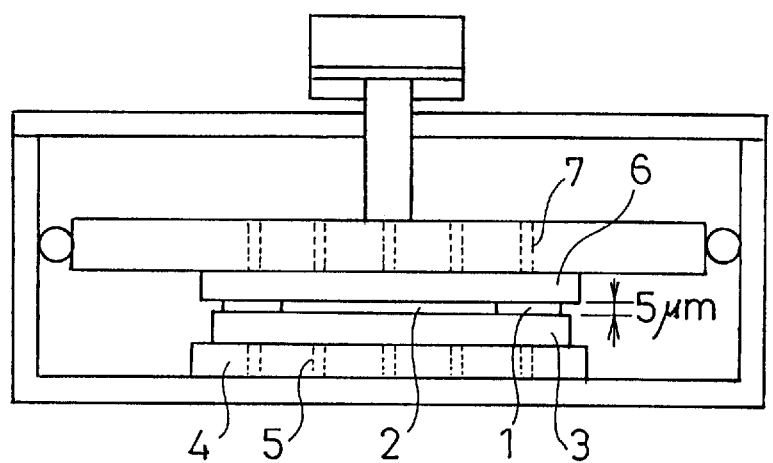

In step (e), the suction-holding mechanism 7 descends in a vertical direction for affixing the upper substrate 6 onto the lower substrate 3 through the adhesive 1, and presses the upper substrate 6 until the distance between the upper and lower substrates becomes 5 $\mu$m (FIG. 2E).

Figure 2F:
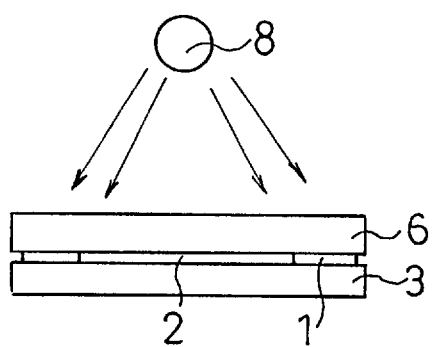
Figure 3:
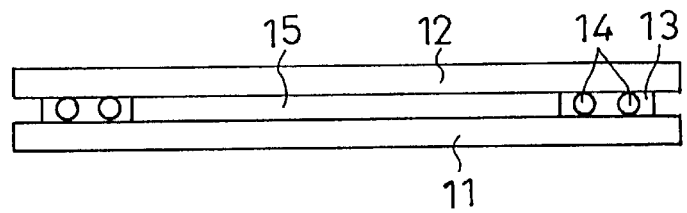
FIG. 3 is a schematic sectional view showing the structure of a liquid crystal display device.
Figure 4A:
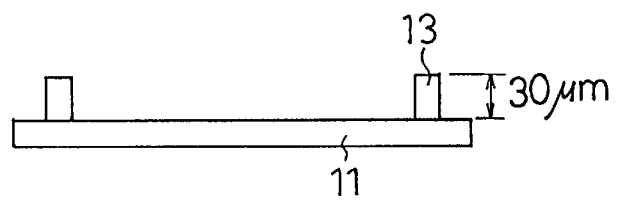
FIGS. 4A–4D are schematic sectional views showing the production steps in sequence according to a liquid crystal drop method for manufacturing liquid crystal display devices.
Figure 4B:
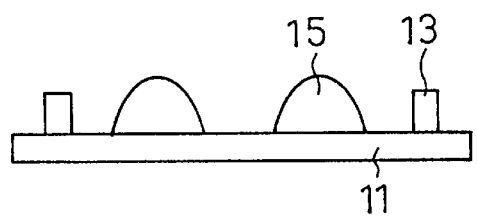
Figure 4C:
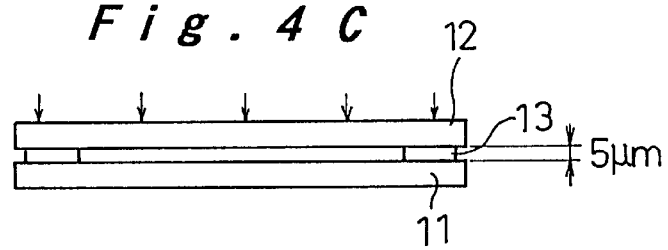
Figure 4D:
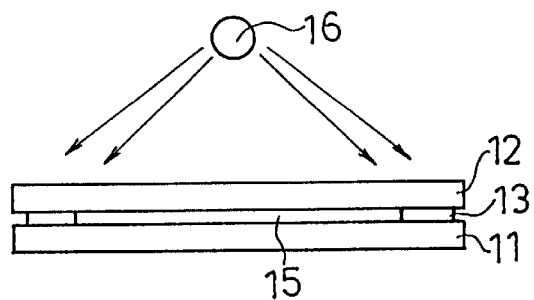
Figure 5A:
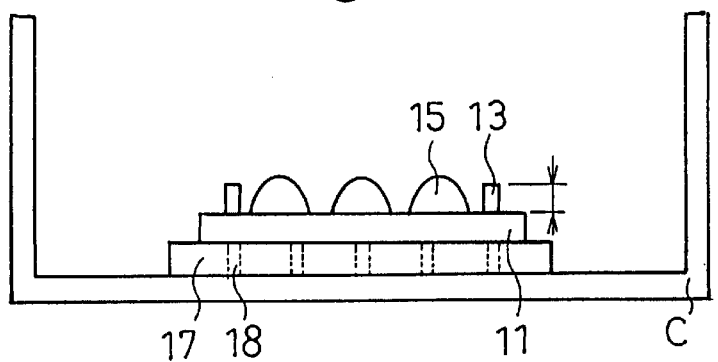
FIGS. 5A–5F are schematic sectional views showing the production steps in sequence according to a conventional method of manufacturing liquid crystal display devices.
Figure 5B:
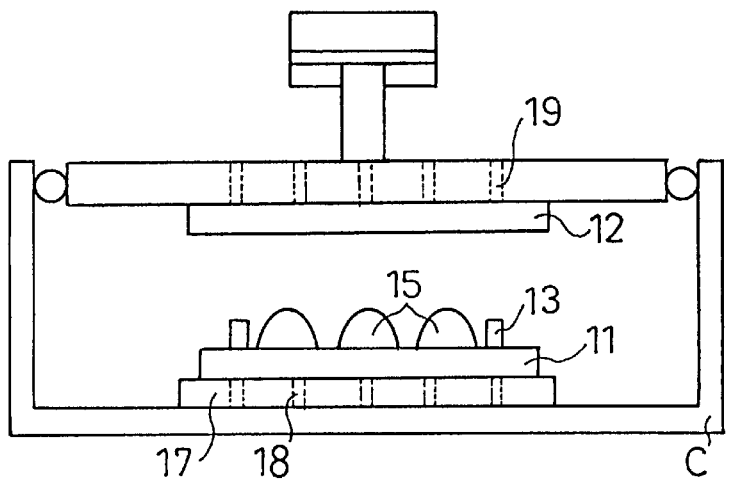
Figure 5C:
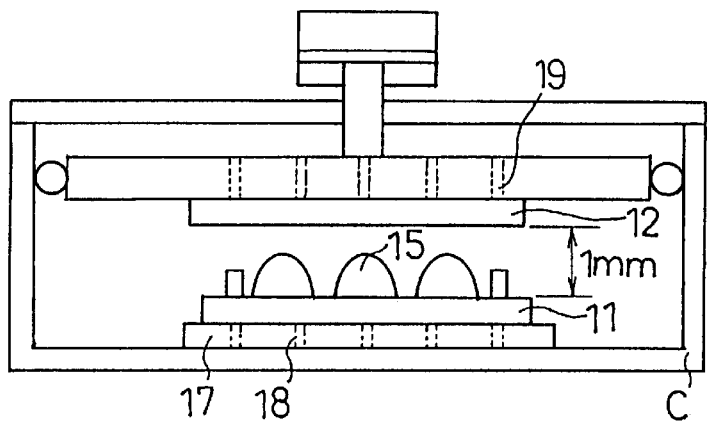
Figure 5D:
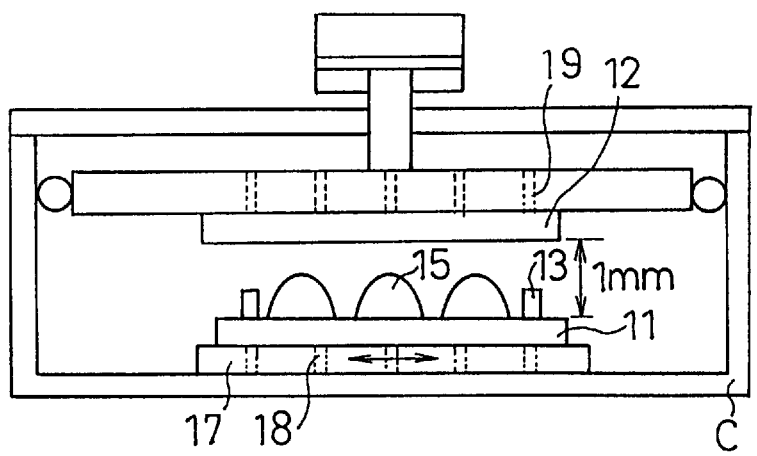
Figure 5E:
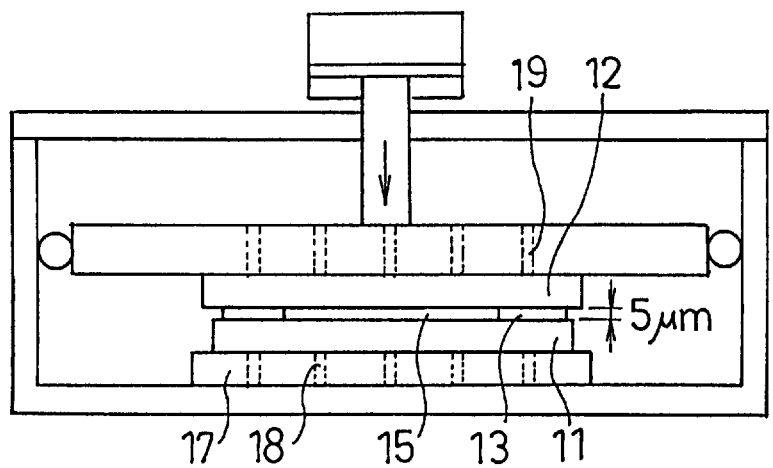
Figure 5F:
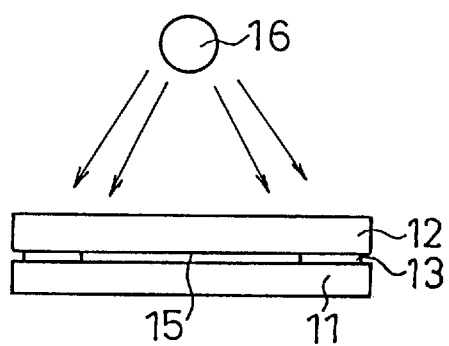

After that, in step (f), the upper and lower substrates are taken out from the vacuum chamber C, and ultraviolet rays 8 are irradiated for curing the adhesive 1, by which the affixing of upper and lower substrates is completed (FIG. 2F).

According to this method, the positioning precision of two opposite spaced substrate 3, 6 can be maintained lower than 1 $\mu$m, by which unevenness in an image displayed on a resulting display panel can be eliminated. Specifically, owing to the preliminary alignment in step (b), the lower substrate 3 needs to be moved only a small distance when its position is adjusted relative to the upper substrate in step (d). The adhesive 1 can thus be prevented from melting in the liquid crystal material 2, that is caused by movements of the substrates relative to each other.

The distance between the upper and lower substrate 3, 6 when pressed to each other in the above described step (e) can be variously set in accordance with the diameter of spacers contained in the adhesive 1.

In order to prevent the upper and lower substrates 3, 6 from being stuck together by the adhesive 1 in which case their positions cannot be adjusted, there may be provided a mechanism by which, in the step of bringing the upper substrate 6 into contact with the adhesive 1 or the liquid crystal material 2, the upper substrate 6 is positioned about 100 $\mu$m above the adhesive 1.

Also, in order to achieve high precision in the spacing control between the upper and lower substrate 3, 6, a resilient member may be interposed between the lower substrate 3 and the suction-holding mechanism 5. In that case, after the affixing of both substrates, the lower substrate 3 should preferably be released from the suction hold and be held fixedly by the suction-holding mechanism 7 for the upper substrate 6. In this way the flatness of upper and lower substrate 3, 6 after they have been affixed together can be highly maintained.

After the upper and lower substrates 3, 6 have been contacted, both substrates may be held by vacuum suction with the suction-holding mechanism 7 for the upper substrate 6 by releasing the lower substrate 3 from the hold of the suction-holding mechanism 5, and with the substrates exposed to atmospheric air by opening the vacuum chamber c, they may be provisionally tacked together with the UV-curable adhesive by irradiating ultraviolet light, so that the upper and lower substrates will not be misaligned relative to each other after they have been affixed together.

Alternatively, immediately after the upper and lower substrates 3,6 have been affixed together, they may be provisionally tacked together with the UV-curable adhesive by irradiating ultraviolet light before opening the vacuum chamber.

In addition, a location mechanism may be further provided for restricting the position of either or both of the upper and lower substrates 3, 6, whereby the hold of the substrate can be made more reliable.

As described above, according to the method of manufacturing liquid crystal display devices of the present invention, the position of the upper substrate is adjusted in relation to the lower substrate after the upper substrate has been brought into contact with the adhesive or the liquid crystal material on the lower substrate. In this way, substrates need not be moved a long distance after they have been positioned to each other, and therefore they will hardly be misaligned after being affixed together. Defects in resulting display panels such as unevenness in image can be thus eliminated.

Alternatively, the substrates may be brought in proximity with each other with a predetermined spacing therebetween, where preliminary alignment between the two substrates is performed. In this way, when positioning the both substrates to each other later, they need to be moved only a small distance, whereby the melting-in of the adhesive into the liquid crystal material can be suppressed.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of manufacturing a liquid crystal display device comprising the steps of
    positioning a first substrate on which an adhesive has been applied and a liquid crystal material has been deposited within a vacuum chamber and holding a lower surface of the first substrate fixedly by vacuum suction;
    positioning a second substrate within the vacuum chamber, the second substrate of which an upper surface is held fixedly by vacuum suction is brought opposite to the first substrate at a predetermined distance therefrom;
    applying a vacuum between the first and second substrate;
    moving one or both of the first and second substrates closer to each other for bringing the second substrate into contact with the adhesive and the liquid crystal material on the first substrate;
    moving both of the first and second substrates relative to each other in a direction parallel to the substrate surface for position alignment; and
    moving one or both of the first and second substrates for pressing the substrates to each other, whereby both substrates are affixed together.

2. The method of manufacturing a liquid crystal display device according to claim 1 wherein in the step of bringing the second substrate into contact with the liquid crystal material on the first substrate, the second substrate is positioned at a height where a minute gap exists between the second substrate and the adhesive on the first substrate.

3. The method of manufacturing a liquid crystal display device according to claim 1 wherein a resilient member is interposed between the first substrate and a mechanism for holding the first substrate by vacuum suction.

4. The method of manufacturing a liquid crystal display device according to claim 3 wherein the first substrate is released from the suction hold after the first and second substrates have been affixed together.

5. The method of manufacturing a liquid crystal display device according to claim 1 wherein the first and second substrates are tacked together with a UV-curable adhesive after they are affixed together, and thereafter the first substrate is released from the suction hold, and the vacuum chamber is opened and exposed to atmospheric air.

6. The method of manufacturing a liquid crystal display device according to claim 1 wherein at least one of the first and second substrates is positioned with the use of a location mechanism.

7. The method of claim 1 wherein the steps of positioning the second substrate and applying the vacuum are performed at the same time.

8. A method of manufacturing a liquid crystal display device comprising the steps of positioning a first substrate on which an adhesive has been applied and a liquid crystal material has been deposited within a vacuum chamber and holding a lower surface of the first substrate fixedly by vacuum suction;

a second substrate of which upper surface is held fixedly by vacuum suction is brought opposite to the first substrate at a predetermined distance therefrom;

applying a vacuum between the first and second substrate;

moving one or both of the first and second substrates closer to each other until they are located at a predetermined spacing;

moving both of the first and second substrates relative to each other in a direction parallel to the substrate surface for preliminary position alignment;

moving one or both of the first and second substrates closer to each other for bringing the second substrate into contact with the adhesive or the liquid crystal material on the first substrate;

moving both of the first and second substrates relative to each other in a direction parallel to the substrate surface for position alignment; and moving one or both of the first and second substrates for pressing the substrates to each other, whereby both substrates are affixed together.

9. The method of manufacturing a liquid crystal display device according to claim 8 wherein in the step of bringing the second substrate into contact with the adhesive or the liquid crystal material on the first substrate, the second substrate is positioned at a height where a minute gap exists between the second substrate and the adhesive on the first substrate.

10. The method of manufacturing a liquid crystal display device according to claim 8 wherein a resilient member is interposed between the first substrate and a mechanism for holding the first substrate by vacuum suction.

11. The method of manufacturing a liquid crystal display device according to claim 10 wherein the first substrate is released from the suction hold after the first and second substrates have been affixed together.

12. The method of manufacturing a liquid crystal display device according to claim 8 wherein the first substrate is released from the suction hold after the first and second substrates have been affixed together, the vacuum chamber is opened and exposed to atmospheric air, and both substrates are tacked together with a UV-curable adhesive.

13. The method of manufacturing a liquid crystal display device according to claim 8 wherein the first and second substrates are tacked together with a UV-curable adhesive after they are affixed together, and thereafter the first substrate is released from the suction hold, and the vacuum chamber is opened and exposed to atmospheric air.

14. The method of manufacturing a liquid crystal display device according to claim 8 wherein at least one of the first and second substrates is positioned with the use of a location mechanism.

15. The method of claim 8 wherein the steps of bringing the second substrate to a position opposite the first substrate and applying the vacuum are performed at the same time.

16. A method of manufacturing a liquid crystal display device in a system wherein a substrate is affixed to another substrate on which an adhesive and liquid crystal material have been applied within a vacuum chamber, comprising:

applying a vacuum between the substrates in the vacuum chamber;

moving one or both of the substrates until one substrate contacts the adhesive on the other substrate;

moving the substrates relative to each other for position alignment; and pressing the substrates against each other so that they are affixed together.

17. A method of manufacturing a liquid crystal display device in a system wherein a substrate is affixed to another substrate on which an adhesive and liquid crystal material have been applied within a vacuum chamber, characterized by evacuating the vacuum chamber so that a vacuum exists, the substrates are brought into close proximity to each other, and the substrates are preliminarily aligned to each other, and one or both of the substrates is/are moved until one substrate contacts the adhesive on the other substrate, after which the substrates are moved relative to each other for position alignment, and the substrates are pressed to each other so that they are affixed together.

18. The method of claim 17 wherein the steps of bringing the substrates into close proximity and applying the vacuum are performed at the same time.

19. A method of manufacturing a liquid crystal display screen comprising the steps of:

positioning a first substrate;

applying an adhesive to a portion of a surface of the first substrate;

applying a liquid crystal material onto the surface of the first substrate;

positioning a second substrate with a surface above and opposite the first substrate surface;

applying a vacuum to the space between the first and second substrate;

moving the first and second substrates closer to each other to a predetermined vertical alignment distance within the vacuum;

moving the first and second substrates relative to each other in a direction parallel to the respective substrate surfaces for positional alignment; and moving the first and second substrates together to enable the adhesive to secure the respective surfaces at a predetermined offset distance for operatively providing the liquid crystal material in contact with the opposing substrate surfaces.

20. The method of claim 19 wherein the step of applying a vacuum is within a vacuum chamber as the second substrate is positioned above the first substrate and further including steps of releasing the vacuum after moving the first and second substrates together to enable the adhesive to secure the respective surfaces and a step of irradiating the adhesive to cure it.

* * * * *